(12) United States Patent
Krisko

(10) Patent No.: US 6,316,111 B1
(45) Date of Patent: *Nov. 13, 2001

(54) HEAT-EMPERABLE COATED GLASS ARTICLE

(75) Inventor: Annette J. Krisko, Prairie du Sac, WI (US)

(73) Assignee: Cardinal CG Company, Minnetonka, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/613,817

(22) Filed: Mar. 1, 1996

(51) Int. Cl.[7] .............................. B32B 17/00; B32B 15/00
(52) U.S. Cl. ...................... 428/434; 428/428; 428/432; 428/433; 428/450; 428/698; 428/213; 428/332; 427/116; 427/383.3; 427/397.7
(58) Field of Search ...................... 428/428, 432, 428/433, 434, 450, 457, 469, 698, 701, 702, 213, 332; 427/166, 383.3, 397.7

(56) References Cited

U.S. PATENT DOCUMENTS

| 4,166,018 | * | 8/1979 | Chapin | 204/192 R |
|---|---|---|---|---|
| 4,594,137 | * | 6/1986 | Gillery | 428/434 |
| 4,619,729 | * | 10/1986 | Johncock | 156/606 |
| 4,737,379 | * | 4/1988 | Hudgens | 427/39 |
| 4,749,397 | | 6/1988 | Chesworth et al. | 65/60.02 |
| 4,790,922 | * | 12/1988 | Haffer | 204/192.27 |
| 4,799,745 | | 1/1989 | Meyer et al. | 350/1.7 |
| 4,806,220 | * | 2/1989 | Finley | 204/192.27 |
| 5,271,994 | * | 12/1993 | Ternath | 428/216 |
| 5,344,718 | * | 9/1994 | Hartig | 428/623 |
| 5,718,980 | * | 2/1998 | Koch | 428/428 |
| 6,060,178 | | 5/2000 | Krisko | 428/627 |

FOREIGN PATENT DOCUMENTS

| 0 035 906 A2 | 9/1981 | (EP) . |
|---|---|---|
| 0 506 507 A1 | 9/1992 | (EP) . |
| 0 546 470 A1 | 6/1993 | (EP) . |
| 0 560 534 A1 | 9/1993 | (EP) . |
| 0 567 735 A1 | 11/1993 | (EP) . |

* cited by examiner

*Primary Examiner*—Deborah Jones
*Assistant Examiner*—Stephen Stein
(74) *Attorney, Agent, or Firm*—Fredrikson & Byron, P.A.

(57) ABSTRACT

A heat-resistant transparent glass article is formed with an inner sandwich structure comprising a metallic infrared-reflective metal film sandwiched between thin protective silicon films, the inner sandwich structure in turn being sandwiched between transparent dielectric films and the film stack being deposited upon a glass substrate. One or both of the transparent dielectric films may also contain silicon.

5 Claims, 2 Drawing Sheets

HEAT-EMPERABLE COATED GLASS ARTICLE

FIELD OF THE INVENTION

This invention is directed to transparent coatings for glass substrates, and particularly to glass substrates having coatings that are capable of withstanding high temperatures such as those encountered during glass tempering and bending.

BACKGROUND OF THE INVENTION

Glass sheets can be coated with a stack of transparent, metal-containing films to vary the optical properties of the coated sheets. Particularly desirable are coatings characterized by their ability to readily transmit visible light while minimizing the transmittance of other wavelengths of light, particularly light in the infrared spectrum. These characteristics are useful for minimizing radiative heat transfer without impairing visibility, and coated glass of this type is useful as architectural glass, glass for use as automobile windows, etc.

Coatings having the characteristics of high transmittance and low emissivity commonly include film stacks having one or more thin metallic films with high infrared reflectance that are disposed between antireflective dielectric films such as metal oxide films. The metallic films may be silver, and the metal oxide films may be the oxides of various metals aid metal alloys including zinc, tin, titanium, etc. Films of the type described commonly are deposited on glass substrates on a commercial production basis through the use of well known magnetron sputtering techniques.

It is often necessary to heat glass sheets to temperatures at or near the melting point of the glass to temper the glass or to enable the glass to be bent into desired shapes such as motor vehicle windshields. Coated glass articles often must be able to withstand high tempatures for periods of time up to several hours. Tempering, as is known, is particularly important for glass intended for use as automobile windshields; upon breaking, windshields desirably exhibit a break pattern in which they shatter into a great many small pieces rather than into large, dangerous sharp shards. Temperatures on the order of 600° C. and above are required. Film stacks employing silver as an infrared reflective film often cannot withstand such temperatures without deterioration of the silver film. To avoid this problem, glass sheets can be heated and bent or tempered before they are coated, and later can be provided with the desired metal and metal oxide coatings. Particularly for bent glass articles, this procedure usually produces non-uniform coatings and is costly.

Another reported method for protecting a reflective metal film from deterioration at high temperatures involves sandwiching the silver film between protective films of an oxidizable metal such as titanium, these protective metal films being of sufficient thickness so that when a coated glass is heated to high temperatures, the protective metal films oxidize. Inasmuch as the oxides of metals commonly are more transparent than the metals themselves, the transmissivity of glass sheets bearing such coatings tends to increase upon heating. Reference is made to Huffer et al. U.S. Pat. No. 4,790,922 and Finley U.S. Pat. No. 4,806,220.

U.S. Pat. No. 5,344,718 (Hartig et al.) describes the use of a film stack in which silver is sandwiched between films of nickel or nichrome, and the resulting sandwich is sandwiched between films of $Si_3N_4$, the glass article having particular values of transmittance and emissivity. It is said that when a Ni:Cr (50:50) alloy is employed, the Cr during sputtering is converted at least in part to a nitride of Cr and that visible transmittance thus is improved. The ability of nickel, chromium and chromium nitride to transmit visible light, however, is not great, and as a result the transmissivity of glass articles that include films of nichrome may be somewhat less than desired.

SUMMARY OF THE INVENTION

The invention in one embodiment relates to a highly desirable heat-resistant glass product that can be manufactured by creating a film stack on glass in which an infrared reflective film such as silver is sandwiched between thin, protective films of a metal or seminconductor such as silicon, and the resulting structure is sandwiched between films of a nitride such as silicon nitride, so that one or both of the protective films contain an element that is also contained in one or both of the nitride films. The preferred element that the protective films and the nitride films have in common is silicon. When glass articles containing the film stack of the invention are heated to high temperatures such as temperatures of 600° or above, as, for example, in the 700° C to 750° C. range, transmissivity of the glass article to visible light may increase slightly.

The thicknesses of the protective films are chosen so that adhesion to the infrared reflective layer is not unduly diminished by the heat treatment. Without being bound by the following explanation, it appears that nitrogen from the nitride films, particularly the outer nitride film, adjacent to the thin, protective films, liberate nitrogen when raised to heat tempering temperatures, and that the nitrogen so released combines to form a nitride with the protective films. Some oxidation of the outer protective film may occur also. In this manner, the protective films serve to protect the infrared reflective metal film from becoming nitrided or oxidized.

When silicon is employed for the protective films, it appears that the protective films are at least partially converted to silicon nitride. Silicon nitride is more transparent than is elemental silicon, * and as a result the transmissivity of the entire glass article is improved if in fact the transmissivity is changed at all by high temperature exposure. Moreover, since an elemental component (e.g., silicon) of both the nitride films and the protective films are the same, sharp interfaces between the protective film and the nitride films are more likely to be avoided, leading to greater stack homogeneity and reducing the likelihood of failure due to separation of the nitride film from the protective film. However, if the protective films comprise silicon and the silicon-containing films are too thin, then the durability of the film stack often is reduced. The silicon-containing layers, and particularly the protective film upon the reflective layer, are deposited at thicknesses such that the film stack can withstand high temperature processing while maintaining good durability, and it appears that this phenomena is due to the retention of unreacted silicon metal on both sides of the infrared reflective layer.

In an alternative embodiment, the nitride films are replaced with oxide films. For example, such a film could comprise silver sandwiched between thin, protective layers of a metal or semiconductor such as silicon, with that structure sandwiched between layers of an oxide of a metal or semiconductor, such as an oxide of silicon (e.g. $SiO_2$) or, less desirably, an oxide of titanium ($TiO_x$). Although these types of film stacks may yield a marginally suitable film stack, the above embodiment wherein nitrides, rather than oxides, are used is preferred.

DETAILED DESCRIPTION OF THE PREFERRED EMBODIMENTS

Figure 1:
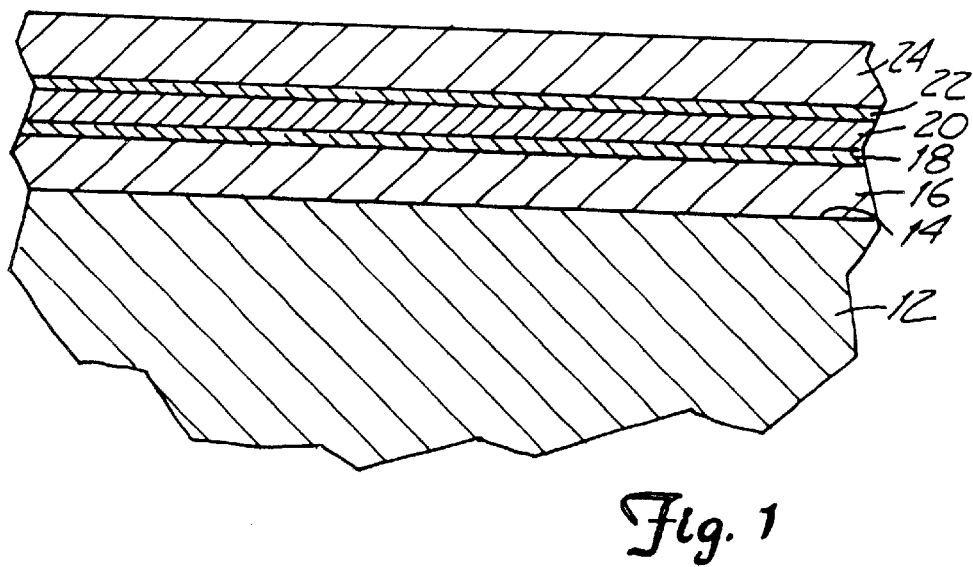
FIG. 1 is a cross-sectional, schematic view of a film stack of the invention.

Referring to the film stack shown in FIG. 1, a glass sheet is shown as 12. Upon its surface 14 is deposited, in sequence, a nitride film 16, a thin protective film 18, an infrared reflective metallic film 20, a thin, protective film 22, and a nitride film 24. It will be understood that the thicknesses of the various films or films in the drawing are not to scale.

The individual films of the film stack of the invention may be deposited upon the glass substrate 12 by any convenient means. A preferred deposition method involves D.C. magnetron sputtering, as described in Chapin U.S. Pat. No. 4,166,018, the teachings of which are incorporated by reference. Magnetron sputter deposition involves transporting a glass substrate through a series of low pressure zones in which the various films that make up the film stack are sequentially applied. Metallic films are sputtered from metallic sources or "targets". A metal film may be formed by sputtering from a metal target in an inert gas atmosphere such as argon, whereas a nitride film such as silicon nitride may be sputtered utilizing a silicon target in a reactive atmosphere containing nitrogen gas. The thickness of films that are thus deposited may be controlled by varying the speed of the glass substrate through a coating compartment, and by varying the power and sputtering rate.

Another method for depositing thin protective films and nitride films upon a substrate involves plasma chemical vapor deposition, and reference is made to Johncock et al., U.S. Pat. No. 4,619,729 and to Hudgens et al., U.S. Pat. No. 4,737,379 for descriptions of this known process. Plasma chemical vapor deposition involves the decomposition of gaseous sources via a plasma and subsequent film formation onto solid surfaces such as glass substrates. Film thickness is adjusted by varying the speed of the substrate as it passes through a plasma zone, and by varying the power and the gas flow rate.

As the infrared reflective metal film, a film of silver is preferred. Silver thicknesses ranging from 80 Å to about 170 Å have been found appropriate, but thicknesses in the range of about 105 Å to about 120 Å are preferred. The thickness of the silver layer is chosen according to the surface conductivity and color requirements.

Nitrogen and oxygen must be substantially prevented from coming into reactive contact with the silver film at glass tempering temperatures, and the thin protective films thus must be capable of chemically reacting with nitrogen and oxygen to form nitrides and oxides to capture any nitrogen and oxygen and thus prevent reaction with the silver reflective film at high temperatures. Silicon readily reacts with nitrogen and oxygen at high temperatures to form the nitride and oxide. The nitride and the oxide of silicon are highly transmissive of visible light, and silicon is preferred for use in the thin protective films on either side of the silver film. Alloys of silicon also are contemplated.

The thin protective silicon-containing films 18, 22 are deposited at a thickness sufficient to protect the silver film from degradation at high temperatures but not so great as to cause undue reduction in visible light transmissivity after heat tempering or reduction in emissivity. When a glass substrate having a film stack of the invention is raised to high temperatures, visible light transmissivity of the stack may slightly increase, to the extent any change in transmissivity occurs. Any slight increase in transmissivity is believed to be a result of the at least partial nitriding or oxidizing, or both, of the thin protective films between which the silver film is sandwiched. Thicknesses on the order of 8 Å for the protective films have given acceptable results; thicknesses in the range of 3 to 15 Å may be employed, with thicknesses in the range of 6 Å to 10 Å being preferred and thicknesses of 7 Å to 9 Å being most preferred. The protective silicon layer beneath the silver film (that is, between the silver film and the glass substrate) preferably is 6 Å to 8 Å in thickness, and the protective silicon film over the silver layer desirably is 8–10 Å in thickness. Silicon layers substantially thicker than 10 Å reduce transmissivity and increase emissivity after tempering to undesirable or unacceptable levels.

The nitride films 16, 24 on either side of what may be termed the "inner sandwich" (formed by sandwiching the silver film between thin, protective films) preferably is silicon nitride. Silicon nitride has the benefit of being highly transmissive of visible light and of imparting substantial chemical and physical durability to the film stack. The nitride films serve as antireflection films. The silicon nitride film 24 that is deposited over the "inner sandwich" is preferably on the order of 350 Å to about 600 Å in thickness depending on the color desired for the final product. The silicon nitride film 16 that is positioned between the glass substrate and the inner sandwich may be on the order of 250 Å to about 500 Å in thickness, again depending upon the desired color.

A film stack of the invention may be prepared utilizing a magnetron sputtering apparatus as referred to above, by sputtering onto a glass substrate a nitrogen-reactive element such as silicon from a target in a nitrogen-containing reactive atmosphere in a first low pressure compartment to form a nitride film, then conveying the glass substrate to one or more further low pressure compartments containing non-reactive (e.g., argon) atmospheres for the deposition of a thin protective film, followed by a film of silver metal or other infrared reflective metal, followed by a second protective film, thereby forming the "inner sandwich" structure over the first nitride film. The glass substrate then is conveyed into another low pressure compartment containing a reactive nitrogen atmosphere, and sputtering from a target causes deposition of a nitride film upon the inner sandwich structure.

When the thin protective films are of silicon and the nitride films on either side of the inner sandwich are of silicon nitride, the coated glass product before heat treatment may typically have a visible light (Illuminant C) transmissivity of about 78%–81%. When the coated glass substrate is tempered at temperatures in the 700° C. range followed by air quenching, transmissivity of visible light may be found to increase slightly to about 80% –85%, an increase of about 2% –5%. The metals for the reflective film and the compositions of the protective films and the dielectric films are so chosen, and the film thicknesses are so controlled, as to yield a glass product which, after tempering or bending at elevated temperatures, exhibits a transmissivity to visible light (Illuminant C) of not less than about 80% and preferably not less than about 85%, and exhibits a slight, if any, increase in transmissivity to visible light upon such high temperature treatment.

Without being bound by the following explanation, it is postulated that when a nitride film such as silicon nitride is formed by magnetron sputtering or by chemical vapor deposition or the like, the resulting silicon nitride may have an amorphous structure enabling the adsorption or absorption of nitrogen gas, or perhaps both, in the course of laying down that film. When the film stack is heated to glass tempering temperatures, the nitrogen gas from the nitride films escapes from these films, and at such high temperatures would be very reactive with the silver infrared reflective film. It is believed that it is this highly reactive nitrogen gas that is emitted from the nitride films that is captured by the thin, protective films between which the silver layer is sandwiched. Since tempering commonly occurs in air (an oxidizing atmosphere), some reactive oxygen gas may penetrate the outermost nitride layer but, as with reactive nitrogen gas, the oxygen also is scavenged by the underlying protective film to form the oxide with that element.

It will be understood that other and further films may be employed in the film stack of the invention. Particularly, one or more films may be employed as an undercoat between the surface of the glass substrate and the first nitride film, and also over the other nitride film. Preferably, the "inner sandwich" structure consists of a silver film sandwiched between two thin protective silicon films, the silver and silicon films being contiguous, that is, touching, and the silicon film nearer the glass substrate being thinner that the other silicon film. In a preferred embodiment, the metal nitride films between which the "inner sandwich" structure is received are contiguous to the respective thin protective films, so that the film stack comprises the following films in sequence and with neighboring films in contact with each other: silicon nitride—silicon—silver—silicon—silicon nitride. In its most preferred embodiment, the film stack of the invention includes the following:

1. A first film of silicon nitride, having a thickness of 250 Å to 450 Å.
2. A second silicon film deposited upon the first silicon nitride film and having a thickness in the range of 5 Å to 7 Å.
3. A third film of silver deposited upon the second silicon film and having a thickness in the range of 105 Å to 120 Å.
4. A fourth protective silicon film having a thickness in the range of 8 Å to 10 Å.
5. A fifth silicon nitride film having a thickness in the range of 350 Å to 600 Å.

Figure 2:
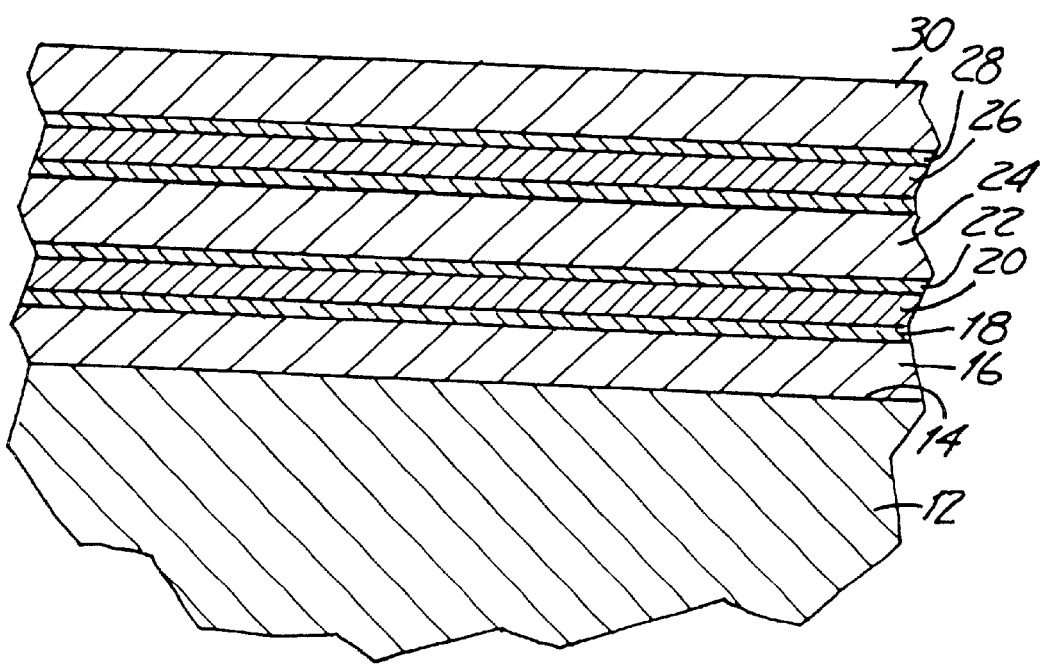
FIG. 2 is a cross-sectional, schematic view of a modified version of the film stack of FIG. 1.

If desired, films 2 through 4 may be repeated, with appropriate adjustments in film thicknesses to obtain the desired transmissivity and emissivity. In this embodiment, which is illustrated in FIG. 2, there is added a sixth silicon film 26, a seventh silver film 28, an eighth silicon film 28, and a ninth silicon nitride film 30.

EXAMPLE

Utilizing a commercial DC magnetron sputtering coating apparatus (Airco), cleaned glass sheets 3 mm in thickness were passed through a series of sputter-coating low pressure compartments to deposit a series of contiguous films on the glass surface. Film thicknesses were determined by sputtering rates. In one coating compartment containing a low pressure atmosphere of argon and nitrogen, silicon was sputtered to provide a first film of silicon nitride 320 Å in thickness directly onto the glass surface. Directly upon the silicon nitride film was deposited a second, thin (6 Å) film of silicon from a silicon target, followed directly by a third, 110 Å thick film of silver from a silver metal target and a forth, thin (8 Å) film of silicon from a silicon target, the silicon and silver films being deposited in low pressure argon atmospheres. Directly on the fourth silicon film was deposited a fifth film, 490 Å in thickness, of silicon nitride in the manner described above with regard to the first film. The resulting glass article was heated in a 730° C. tempering furnace and then immediately air quenched, using a standard heating and quenching cycle of 2½ to 3 minutes. Transmissivity measured before tempering was 78%, and after tempering, 82%. Electric surface resistivity, which varies more or less proportionally with emissivity, was measured using a four probe ohmmeter (sometimes called a "four point" measurement). Resistivity in the range of about 6.5 to about 10 ohms/square is desired. Surface resistivity measured before and after tempering showed a decrease in resistivity from values in the 11 to 12 ohms/square to values in the 8 to 9 ohms/square range, signifying a reduction in emissivity. For film stacks of the invention having single silver or other infrared reflective films, four point resistivities not greater than 10 ohms/square are desired. For film stacks of the invention having two silver or other infrared reflective films, four point resistivities not greater than 5 ohms/square are desired, with 2.5 to 5 ohms/square being preferred.

As noted above, care must be taken in controlling the thickness of the thin silicon-containing protective films, and particularly the film deposited on the silver layer. In one experiment, it was found that the durability of the film stack suffered when either of the protective layers was too thin, and it is thought that poor durability was due to the failure of adhesion between the silver film and either or both of the protective films between which the silver film is sandwiched. In this experiment, the thicknesses of the silver and the silicon nitride in the most preferred embodiment as disclosed above remained constant, and the thicknesses of the silicon films were varied by varying the sputtering power between 1 and 2.8 kW utilizing an 84 inch width Airco commercial DC magnetron sputter coating apparatus and a glass speed of 375 inches per minute. $H_2O$ resistance refers to the ability of the coating to withstand manual rubbing with a wet cotton glove.

TABLE 1

| Si layer under Ag; kW | Si layer over Ag; kW | $H_2O$ Resistance | Transmissivity % |
| --- | --- | --- | --- |
| 2.8 | 2.8 | Good | 80.5 |
| 2.6 | 2.6 | Good | 80.8 |
| 2.4 | 2.4 | Fair | 81.3 |
| 2.0 | 2.0 | Poor | — |
| 2.4 | 2.8 | Good | 81.5 |
| 2.0 | 2.8 | Fair | 82.5 |
| 1.4 | 2.8 | Poor | — |
| 1.0 | 2.8 | Poor | — |

While a preferred embodiment of the present invention has been described, it should be understood that various changes, adaptations and modifications may be made therein without departing from the spirit of the invention and the scope of the appended claims.

What is claimed is:

1. A transparent heat-resistant glass article comprising a transparent glass substrate and a transparent film stack deposited upon the substrate, said film stack comprising, from the glass substrate outwardly, a transparent silicon nitride film, a film of elemental silicon, a transparent infrared reflective silver-containing metallic film, a film of elemental silicon, and a transparent silicon nitride film.

2. The transparent glass article of claim 1, wherein the silver containing layer is sandwiched between said elemental silicon films and wherein the elemental silicon film over the silver-containing film is thicker than the elemental silicon film between the silver-containing film and the glass substrate.

3. A transparent heat-resistant glass article comprising a glass substrate and a transparent film stack deposited upon the substrate, said film stack comprising, from the glass substrate outwardly, a transparent silicon nitride film having a thickness of from 250 Å to 500 Å, a first protective film of elemental silicon, a transparent infrared reflective silver-containing metallic film, a second protective film of elemental silicon, and a transparent silicon nitride film having a thickness of 350 Å to 600 Å.

4. The transparent heat-resistant glass article of claim 1 or claim 3 wherein one or both of said films of elemental silicon has a thickness of 3 Å to 15 Å.

5. Method for manufacturing a heat treated transparent glass article comprising depositing on a surface of the glass article a transparent film stack comprising, from the glass substrate outwardly, a first transparent nitride film, an elemental silicon second film, a transparent infrared reflective metallic third film, an elemental silicon fourth film, and a fifth transparent nitride film, wherein one or both of said nitride films comprises silicon nitride and heating said coated article.

* * * * *

UNITED STATES PATENT AND TRADEMARK OFFICE
CERTIFICATE OF CORRECTION

PATENT NO. : 6,316,111 B1
DATED : November 13, 2001
INVENTOR(S) : Annette J. Krisko It is certified that error appears in the above-identified patent and that said Letters Patent is hereby corrected as shown below:

<u>Title page,</u>
Item [54], please correct the title of the invention, "HEAT-EMPERABLE COATED GLASS ARTICLE" to -- HEAT-TEMPERABLE COATED GLASS ARTICLE --.

<u>Column 5,</u>
Line 67, please correct "forth" to read -- fourth --.

Signed and Sealed this

Twenty-eighth Day of January, 2003

JAMES E. ROGAN
*Director of the United States Patent and Trademark Office*